United States Patent [19]

Abdallah

[11] Patent Number: 5,469,376
[45] Date of Patent: Nov. 21, 1995

[54] DIGITAL CIRCUIT FOR THE EVALUATION OF MATHEMATICAL EXPRESSIONS

[76] Inventor: Mohammad A. F. F. Abdallah, P.O. Box 16356, LSU, Baton Rouge, La. 70893

[21] Appl. No.: 136,298

[22] Filed: Oct. 14, 1993

[51] Int. Cl.[6] ............................... G06F 7/38; G06F 7/02; G05B 1/00
[52] U.S. Cl. ........................ 364/735; 340/146.2
[58] Field of Search ..................... 364/735, 736, 364/737, 748, 752, 760, 761, 764, 718, 721; 340/146.2

[56] References Cited

U.S. PATENT DOCUMENTS 4,760,374  7/1988  Moller .................................. 340/146.2
5,341,120  8/1994  Nakajima ............................ 340/146.2

FOREIGN PATENT DOCUMENTS 1716  3/1993  United Kingdom .
1736  9/1993  United Kingdom .

Primary Examiner—Roy N. Envall, Jr.
Assistant Examiner—Emmanuel L. Moise
Attorney, Agent, or Firm—Robert C. Tucker; William David Kiesel; Russel O. Primeaux

[57] ABSTRACT

A digital circuit for determining the result of mathematical operations and functions when supplied with three binary values having a fixed number of binary bits which correspond to: (i) an initial left boundary limit of a first interval, (ii) an initial right boundary limit of a first interval, and (iii) a given working value.

8 Claims, 15 Drawing Sheets

| Address=x | Result(32-bit) Cos(x) | Result(32-bit) Cosh(x) | Result(32-bit) Sinh(x) |
|---|---|---|---|
| 0000000 | (1/U1)*cos(0/2^6) | (1/U2)*cosh(0/2^6) | (1/U2)*sinh(0/2^6) |
| 0000001 | (1/U1)*cos(1/2^6) | (1/U2)*cosh(1/2^6) | (1/U2)*sinh(1/2^6) |
| 0000010 | (1/U1)*cos(2/2^6) | (1/U2)*cosh(2/2^6) | (1/U2)*sinh(2/2^6) |
| ....... | | | |
| ....... | | | |
| 0111111 | (1/U1)*cos(63/2^6) | (1/U2)*cosh(63/2^6) | (1/U2)*sinh(63/2^6) |
| 1000000 | (1/U1)*cos(64/2^6) | (1/U2)*cosh(64/2^6) | (1/U2)*sinh(64/2^6) |
| ....... | | | |
| ....... | | | |
| 1111111 | (1/U1)*cos(127/2^6) | (1/U2)*cosh(127/2^6) | (1/U2)*sinh(127/2^6) |

$U1 = \begin{cases} 0.9999593104 & \text{:for the embodiment shown in fig. 14.} \\ 1.0000000000 & \text{:for the embodiment shown in fig. 6 and 8.} \end{cases}$ $U2 = \begin{cases} 1.000040691 & \text{:for the embodiment shown in fig. 14.} \\ 1.0000000000 & \text{:for the embodiment shown in fig. 6 and 8.} \end{cases}$ The constants are for the example of 32-bit operands.

Exp(x)=(cosh(x)+sinh(x))/2      sin(x)=cos(22/7-x)

Figure 4

| Address= x | Result(8-bit) $\cos^{-1}(x)$ | Result(8-bit) $Ln(x)$ | Result(8-bit) $\cosh^{-1}(x)$ | Result(8-bit) $\sinh^{-1}(x)$ |
|---|---|---|---|---|
| 0000000 | $\cos^{-1}(0/2^7)$ | $Ln(0/2^7)$ | $\cosh^{-1}(0/2^7)$ | $\sinh^{-1}(0/2^7)$ |
| 0000001 | $\cos^{-1}(1/2^7)$ | $Ln(1/2^7)$ | $\cosh^{-1}(1/2^7)$ | $\sinh^{-1}(1/2^7)$ |
| 0000010 | $\cos^{-1}(2/2^7)$ | $Ln(2/2^7)$ | $\cosh^{-1}(2/2^7)$ | $\sinh^{-1}(2/2^7)$ |
| ....... | | | | |
| ....... | | | | |
| 0111111 | $\cos^{-1}(127/2^7)$ | $Ln(127/2^7)$ | $\cosh^{-1}(127/2^7)$ | $\sinh^{-1}(127/2^7)$ |
| 1000000 | $\cos^{-1}(128/2^7)$ | $Ln(128/2^7)$ | $\cosh^{-1}(128/2^7)$ | $\sinh^{-1}(128/2^7)$ |
| ....... | | | | |
| ....... | | | | |
| 1111111 | $\cos^{-1}(255/2^7)$ | $Ln(127/2^7)$ | $\cosh^{-1}(255/2^7)$ | $\sinh^{-1}(255/2^7)$ |

Figure 5

DIGITAL CIRCUIT FOR THE EVALUATION OF MATHEMATICAL EXPRESSIONS

BACKGROUND OF THE INVENTION

This invention relates to devices that perform mathematical operations and functions and more particularly to devices which employ digital circuitry to determine the result of mathematical operations and functions within a determined error for given input values using a fixed number of iterations.

SUMMARY OF THE INVENTION

The device of the present invention determines the result of arithmetic operations and functions within a predetermined error without calculating directly the arithmetic operation or function or their inverse. The device generates the result by using an interval containing the result, an interval containing the condition and a searching and boundary value replacement technique. However, one of the intervals may be implicit. FIG. 1 is a block diagram illustrating the organization of the device units.

The theory behind the device is best illustrated by using an example. The example used will be the multiplication operation: A*B; where "A" is a normalized multiplier and "B" is a normalized multiplicand.

When expressed in binary form, the normalized value of the multiplicand "A" will lie on the interval between the left and right boundary points [1, 2]. Since "A" lies on the interval between [1, 2], A*B must lie on the interval between the left and right boundary points [1*B, 2*B]. To determine the value of A*B, two intervals are established, (a Condition Interval $[C_L, C_R]$ where $C_L=1$, and $C_R=2$; and a Result Interval $[R_L, R_R]$ where $R_L=C_L*B$ and $R_R=C_R*B$). Once the two intervals are established, the value of A*B can be determined using the following searching and boundary value replacement technique.

The midpoint of the condition interval, $Midpoint_c$, is calculated using the formula: $(C_L+C_R)/2$. $Midpoint_c$ is then compared with the actual value of "A". If $Midpoint_c$ is greater than the actual value of "A" then the right bound of the condition interval, $C_R$, is replaced with the value calculated for $Midpoint_c$. If $Midpoint_c$ is less than the actual value of "A" then the left bound of the condition interval, $C_L$, is replaced by the value calculated for $Midpoint_c$.

The value of the midpoint of the result interval, $Midpoint_c$ is then calculated using the formula: $(R_L+R_R)/2$; and the corresponding left or right bound of the result interval is replaced with the value calculated for $Midpoint_R$.

The process is repeated, using the new values for $C_L$ and $R_L$ or $C_R$ and $R_R$, until the actual value of "A" is surrounded by an interval having a length equal to the error attributable to the precision of the number of binary bits used to describe the actual value of "A". When this occurs, the value of A*B lies on the final result interval and the determined value for A*B may be expressed as the value of $Midpoint_R$ within an error equal to one-half (½) the length of the final result interval.

It has been noted, by the inventor hereof, that the actual normalized binary value of "A" contains the information required to determine which side of the result interval to replace with $Midpoint_R$ during any given iteration when evaluating direct functions. Taking advantage of this fact eliminates the need for the condition interval calculations mentioned previously.

The replacement information for the first iteration is located in the most significant bit of the normalized binary value of "A"; the replacement information for the second iteration is in the next most significant bit; and so on, until the least significant bit which contains the replacement information for the last iteration. Since the replacement information is already known for any given iteration in sequential implementation of the device, the actual value of "A" may be loaded into a shift register and shifted to the left for each iteration. The value shifted out will supply the control signal to the registers holding the left and right boundaries of the result interval. In parallel implementation as shown in FIG. 2 the decoding of the bits of "A" may be done simultaneously.

It should be pointed out that the only operations required to determine the value of A*B are addition and subtraction, and multiplication and division by 2. These are all operations easily implemented by digital hardware.

BRIEF DESCRIPTION OF THE DRAWINGS

FIG. 4 is the table of values to be stored in ROM for the direct functions.

FIG. 5 is the table of values to be stored in ROM for the inverse functions.

DETAILED DESCRIPTION OF PREFERRED EMBODIMENTS OF THE INVENTION

Figure 3:
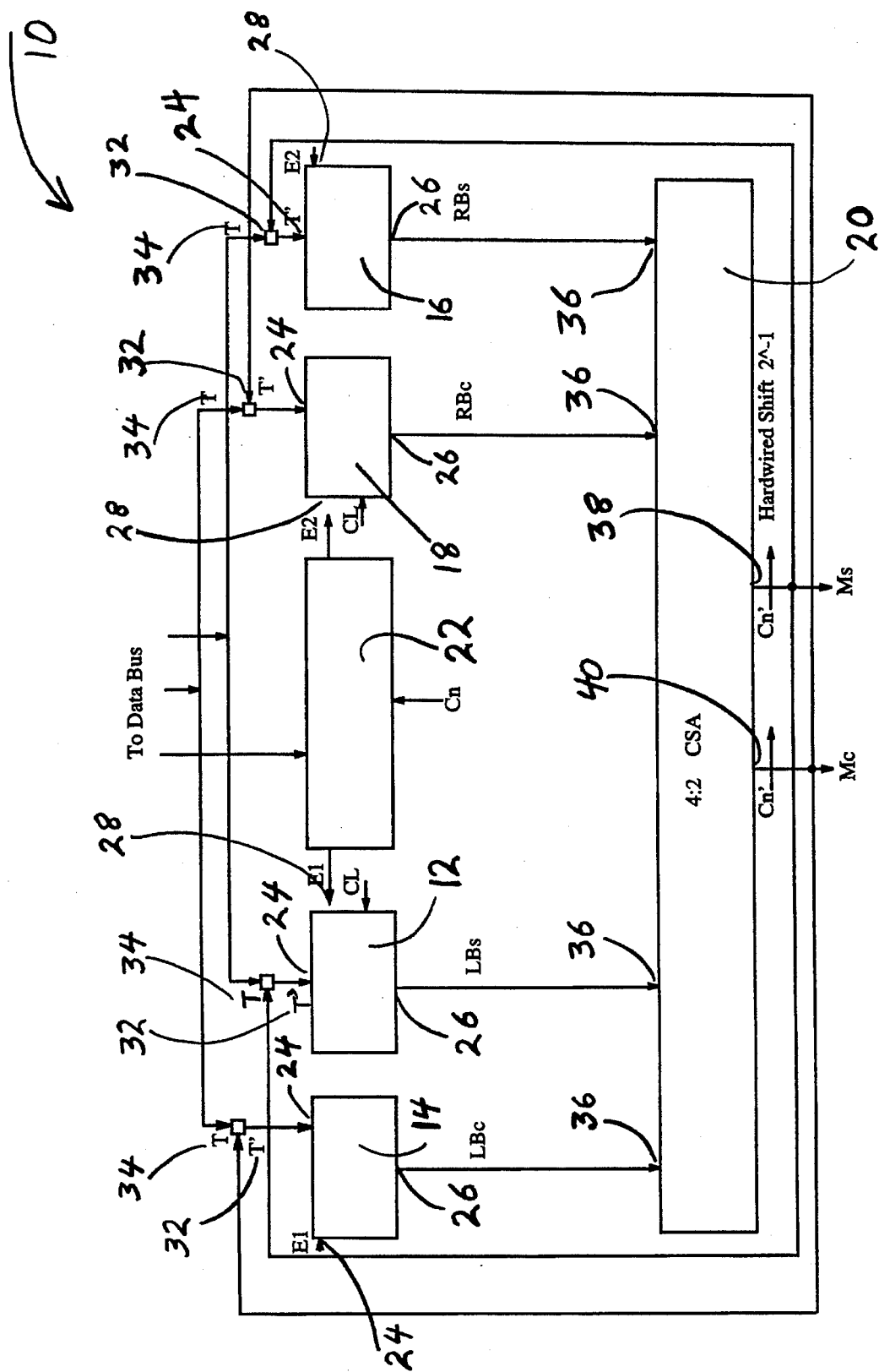
FIG. 3 is block diagram of a device for evaluating multiplication.

FIG. 3 shows an embodiment of device 10 of the present invention which performs the multiplication operation on two normalized 32-bit binary numbers "A" and "B". The circuit includes four 32-bit storage registers 12,14,16,18, a 4:2 carry save adder 20, and a 32-bit shift register 22.

The four storage registers 12,14,16,18 are designated: the left boundary sum register 12, the left boundary carry register 14, the right boundary sum register 16 and the right boundary carry register 18. Each of the storage registers has a 32-bit data input port 24, a 32-bit data output port 26, and an enable control input 28. When the condition on the enable control input 28 of a storage register is true the storage register transfers the 32-bit data word currently on its data input port 24 into its storage cells and puts the 32-bit data word out on its data output port 26. The data input ports 24 of each storage register are connected at a node to two complimentarily enabled tri-state buffers 32,34 to allow initialization of the device 10. The data output ports 26 of all four storage registers are connected to the input port 36 of the carry save adder 20.

The 4:2 carry save adder 20 has a 32-bit input port 36 for each of the data output ports 26 of the four storage registers. The carry save adder 20 sums the values placed on its input ports 36 and places the calculated sum out on its 32-bit sum output port 38 and the calculated carry out on its 32-bit carry output port 40. The sum output of the carry save adder 20 is hardwire shifted one bit to the right and connected to the data input ports 24 of the left and right boundary sum registers 14,18 through tri-state buffers 32. The carry output of the carry save adder is hardwire shifted one bit to the right and connected to the data input ports 24 of the left and right boundary carry registers 22,26 through tri-state buffers 32. Tri-state buffers 32 are only tri-stated when the initial boundary values for the result interval are loaded during initialization of the device 10. It should be noted that the sum of the outputs of the 4:2 carry save adder 20 equals Midpoint$_R$ after the hardwire shift is accomplished.

The shift register 22 shifts its stored contents one bit to the left during each iteration of the circuit. The most significant bit of the number contained in the register is shifted out onto the control output line which in-turn is connected to the enable control inputs 28 of the storage registers. The value of this bit determines whether the calculated value of Midpoint$_R$ is stored in the left boundary 12,14 or the right boundary 16,18 registers. In this preferred embodiment, the true condition for the enable control inputs 28 to the left boundary registers 12,14 is high. The true condition for the right boundary registers 16,18 is low. Therefore, if the bit shifted out of the shift register 22 during any iteration is a 1, the values in the left boundary registers 12,14 are replaced with the values from the outputs of the carry save adder 20. If the bit shifted out is a 0 then the values in the right boundary registers 16,18 are replaced.

In use, the circuit is initialized by: (i) loading the left boundary sum register 12 with 1*B; (ii) loading the right boundary sum register 16 with 2*B; (iii) clearing the left and right boundary carry registers 14,18; and (iv) loading the normalized value of "A" into the shift register 22. This is accomplished by tri-stating the tri-state buffers between the carry save adder 20 and the data input ports 24 of the storage registers; and, placing the desired value on the data input port 24 through its complimentarily enabled tri-state buffer while the enable control input 28 of the desired storage register 12,14,16,18 is forced into the true state. The loading and clearing of the registers need not be performed in any particular order. All that is required is that all the registers be cleared or loaded with the correct values prior to beginning the iteration sequence.

To begin determination of the result, the tri-state buffers between the output ports 38,40 of the carry save adder 20 and the storage register data input ports 24 are opened and the tri-state buffers opened during the initialization are put into the tri-state mode. Once this is accomplished the shift register 22 may be shifted by a clock signal (not shown) from an outside source or a clock signal may be supplied by a clock within the circuit (not shown) if desired.

Since there is a direct correlation between the result interval and the implicit condition interval "A", no error is generated when determining the result of operations such as multiplication and division.

If it is desired to use the device 10 to determine the result of functions or operations such as trigonometric, hyperbolic exponential functions and the square function and its inverses, the above described device 10 must be modified to include an error counter balancing unit, and the initial values of the result interval boundaries must be determined and error adjusted prior to loading the storage registers 12,14, 16,18 during initialization.

A preferred method of conditioning the result interval boundaries to compute, error adjust, and store in memory all possible results of the desired functions and operations for the 7 most significant bits of the normalized values of the argument or operand of the function or operation. This means 128 results will need to be calculated and stored for each function or operation desired to be implemented. This method may be employed when the argument of the functions can be in the interval between [0,2]. If different normalization reduces this interval then memory storage requirements may be reduced accordingly. Seven bits are used for 32-bit implementation, however, if the argument contains more bits additional values must be computed and error adjusted. In the case of 56-bit computation the 13 most significant bits should be computed and error adjusted.

During the initialization process, the result corresponding to the 7 most significant bits of the argument or operand of the desired function or operation is retrieved from memory and directed to the left boundary sum register 12. The 7 most significant bits of the argument or operand is then incremented and the result corresponding to the new value is retrieved and directed to the right boundary sum register 16 during initialization.

The computed and error adjusted result values may be stored in a system memory, if the device 10 is to be used as part of a computer system (not shown), or stored in a ROM or array of ROMs, if the device is to be used outside of a computer system. When using the ROM or array of ROMs, any well known addressing scheme which will allow the result values to be retrieved and loaded during initialization of the device 10 is sufficient to practice the invention.

FIGS. 4 and 5 show the forms for calculating the error adjusted result values for: cos(X); cosh(X); sinh(X); cos$^{-1}$(X); Ln(X); cosh$^{-1}$(X); and, sinh$^{-1}$(X) for values of x lying between 0 and 2. It should be noted that the values must be compensated for error using the formulas for each function as shown in the Figures. Also, other functional values can be obtained from the previous functions as shown in FIG. 4.

Figure 1:
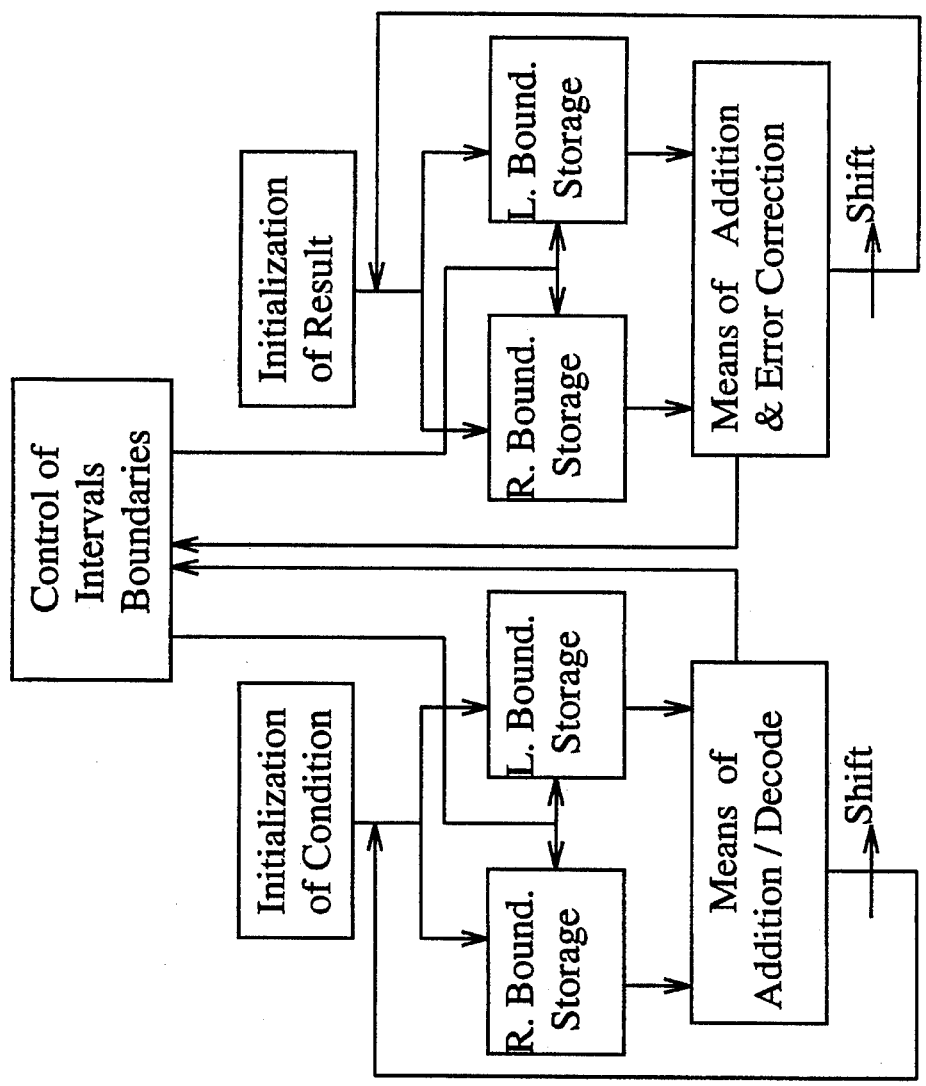
FIG. 1 is a block diagram of the organization of the units of the device.
Figure 6:
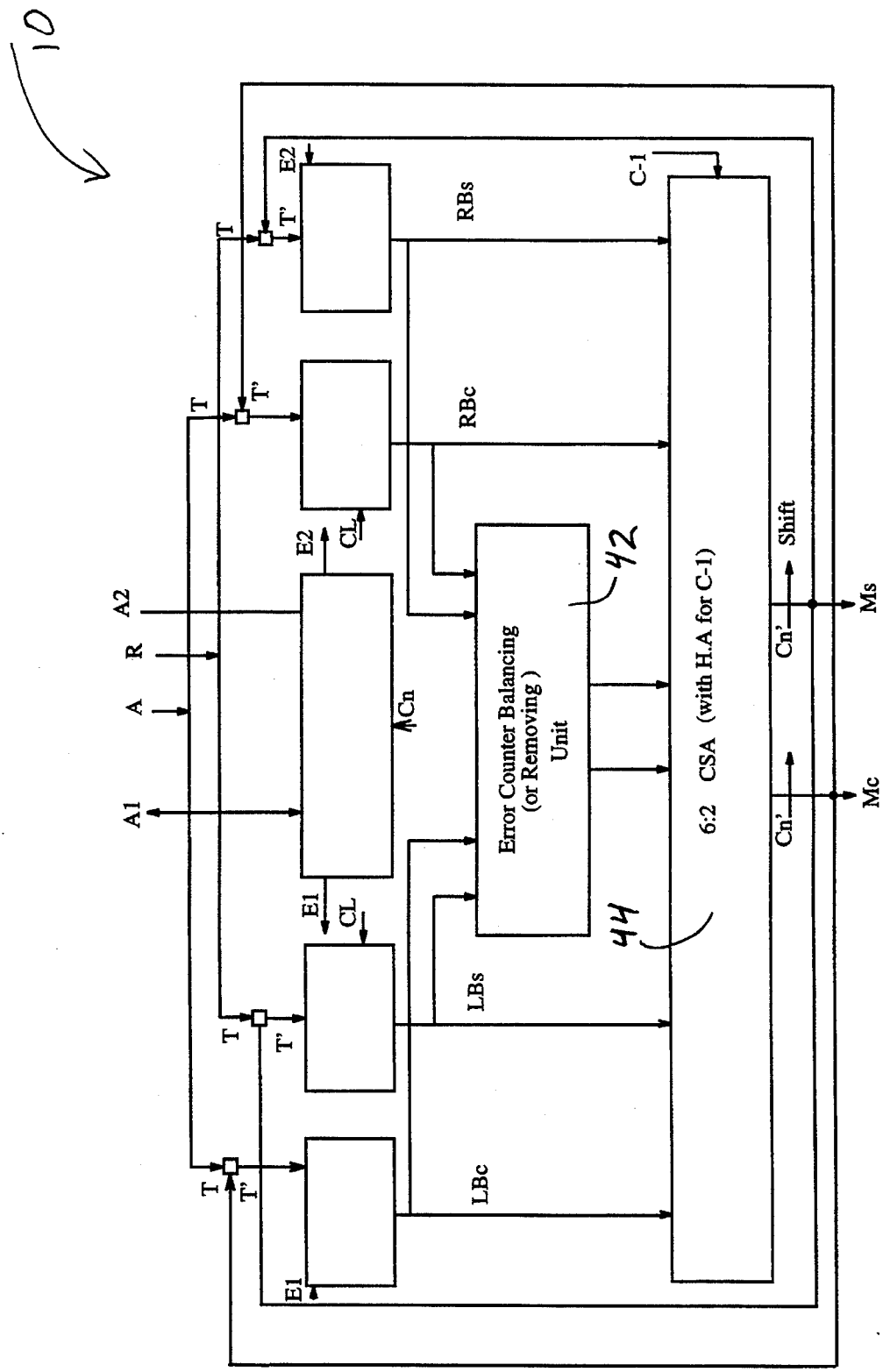
FIG. 6 is the device of FIG. 3 in which an error counter balancing unit adjusting unit has been added.

FIG. 6 shows an embodiment of the device 10 of the present invention which includes an error counter balancing unit 42. In this preferred embodiment, the 4:2 carry save adder 20 of the device 10 described in FIG. 1 is replaced with a 6:2 carry save adder 44 and an error counter balancing unit 42 is added.

Figure 7:
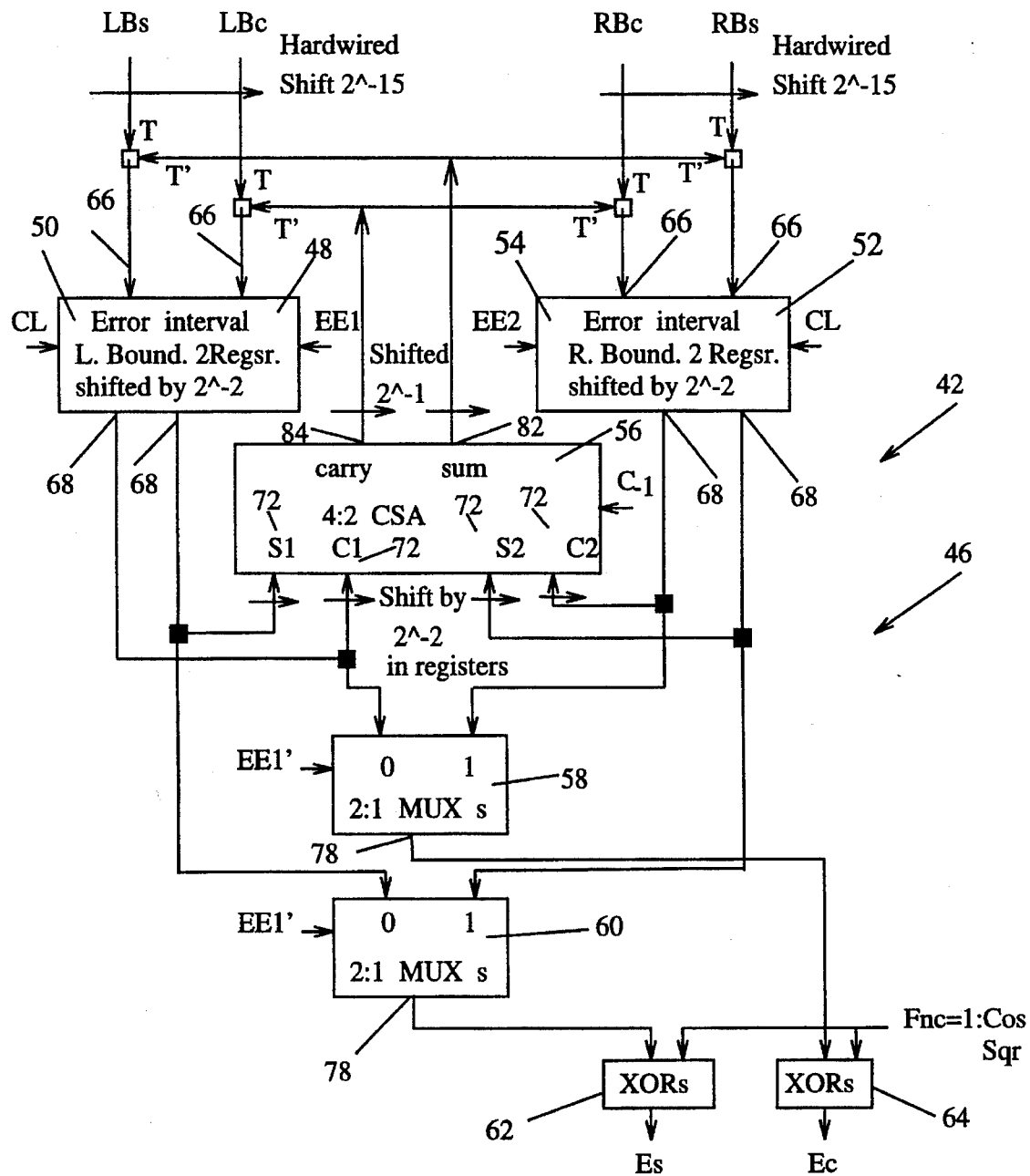
FIG. 7 is a diagram of a preferred error balancing unit.
Figure 7A:
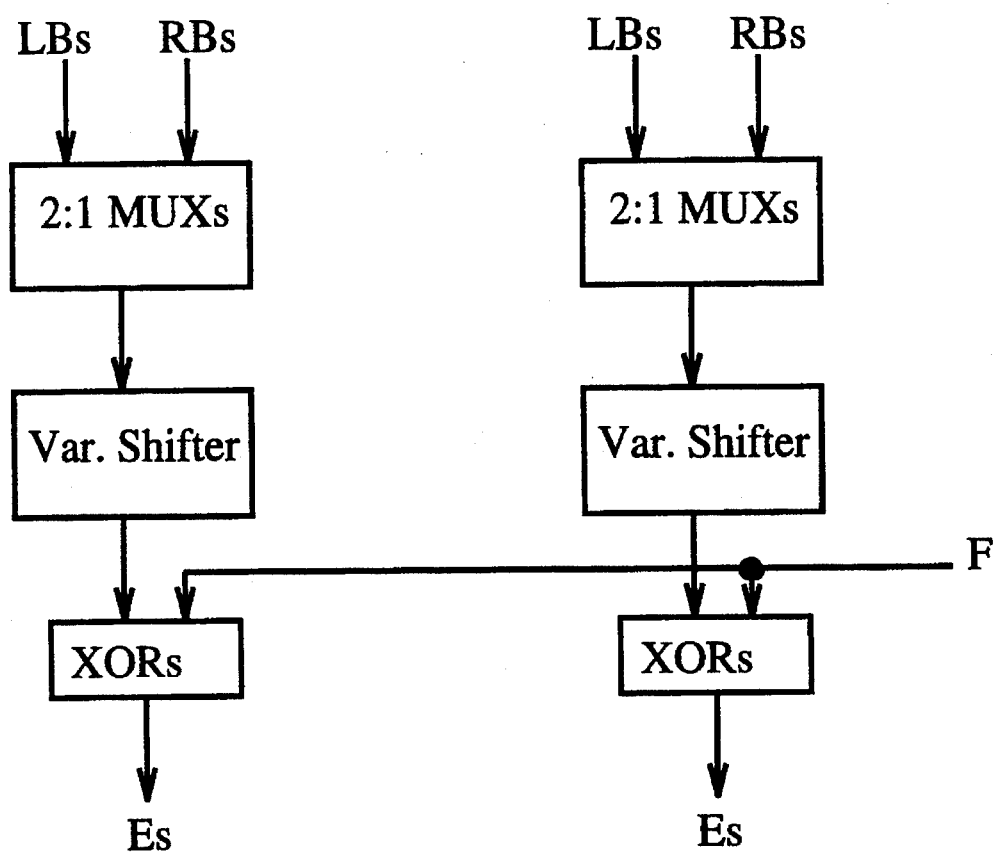
FIG. 7a is a diagram of another preferred error counter balancing unit.

FIG. 7 shows a schematic diagram of a preferred error counter balancing unit 42. The preferred error counter balancing circuit 46 includes four 32-bit error interval storage registers 48,50,52,54, a 4:2 carry save adder 56, two 32-bit 2:1 multiplexers 58,60 and 2 arrays of 32 2-bit exclusive OR gates 62,64.

The four error interval storage registers are designated: the left boundary sum error register 48, the left boundary carry error register 50, the right boundary sum error register 52 and the right boundary carry error register 54. Each of the boundary error registers has 32-bit data input 66 and output ports 68 and an enable control input 70. When the condition on the enable control input 70 of an error interval storage register is true the storage register 48,50,52,54 transfers the 32-bit data word currently on its data input port 66 into its storage cells (not shown) and puts the new 32-bit data word out on its data output port 68. The data input ports 66 of each error interval storage register are connected at a node to two complimentarily enabled tri-state buffers. The data output ports 68 of all four storage registers are hardwire shifted to the right two bits and connected to the inputs 72 of the 4:2 carry save adder 56. The unshifted output of the left boundary carry error register 50 is connected to port 0 of the first 2:1 multiplexer 58; the unshifted output of the left boundary sum error register 48 is connected to port 0 of the second 2:1 multiplexer 60; the unshifted output of the right boundary carry error register 54 is connected to port 1 of the first 2:1 multiplexer 58; and, the unshifted output of the left boundary sum error register 52 is connected to port 1 of the second 2:1 multiplexer 60. The output 78 of the first and second 2:1 multiplexers 58,60 is Exclusive-ORed with the Fnc control signal.

The Fnc signal equals 1 when the functions in the following list are to be performed: $Cos(X)$, $Cos^{-1}(X)$, $(X)^2$, and square rooting. The Fnc signal equals 0 when other operations or functions which require the error counter balancing unit are to be performed. It should be noted at this point that all operations other than multiplication and division require error correction; and that all of the functions require error correction.

The 4:2 carry save adder 56 has a 32-bit input port 72 for each of the data output ports 66 of the four boundary error storage registers. The carry save adder 56 sums the values placed on its input ports 72 and places the calculated sum out on its 32-bit sum output port 82 and the calculated carry out on its 32-bit carry output port 84. The sum output of the carry save adder 56 is hardwire shifted to the right 1 bit and connected to the data input ports 66 of the left and right boundary sum error registers 48,52 through tri-state buffers. The carry output of the carry save adder 56 is hardwire shifted to the right 1 bit and connected to the data input ports of the left and right boundary carry error registers 50,54 through tri-state buffers. The T enabled tri-state buffers are only tri-stated when the initial values for the result interval are loaded into the boundary storage registers during initialization of the device 10. The values stored in each of the boundary error registers is the value stored in each respective boundary storage register 12,14,16,18 hardwire shifted 15 bits to the right in the case of 32 bit operands.

During operation of the device 10, the shift register 22 shifts its stored contents one bit to the left during each iteration of the circuit. When computing direct functions the most significant bit of the number contained in the shift register 22 is shifted out onto the control output line connected to the enable control inputs 28 of the storage registers 12,14,16,18, this control output time delayed one iteration cycle and used to enable the error interval storage registers 48,50,52,54. However, in error memory adjusted functions using one error compensating unit, since the result is already known for the seven most significant bits from the ROM, the shift register 22 must begin shifting with the eighth most significant bit and continue toward the least significant bit. This problem is solved for this embodiment of the device 10 by shifting the shift register 22 seven times during the initialization of the device 10. However, for the inverse functions controlling the enable signal comes from the carry signal Cn While the shift register shifts the result into its cells from the Inp port which is connected in this case to the carry.

Error correction is necessary during each iteration of the device 10 to correctly calculate the new $Midpoint_R$. The true condition for the enable control inputs 70 to the left boundary sum and carry error registers 48,50 high. The true condition for the right boundary sum and carry registers 52,54 is low. Therefore, in the case of a direct function, if the most significant bit shifted out of the shift register 22 during the previous iteration was a 1, the values in the left boundary registers 48,50 are replaced with the values from the outputs of the carry save adder 56. If the bit shifted out was a 0 then the values in the right boundary registers 52,54 are replaced. In the case of inverse functions the carry Cn controls the enable signals.

Figure 8:
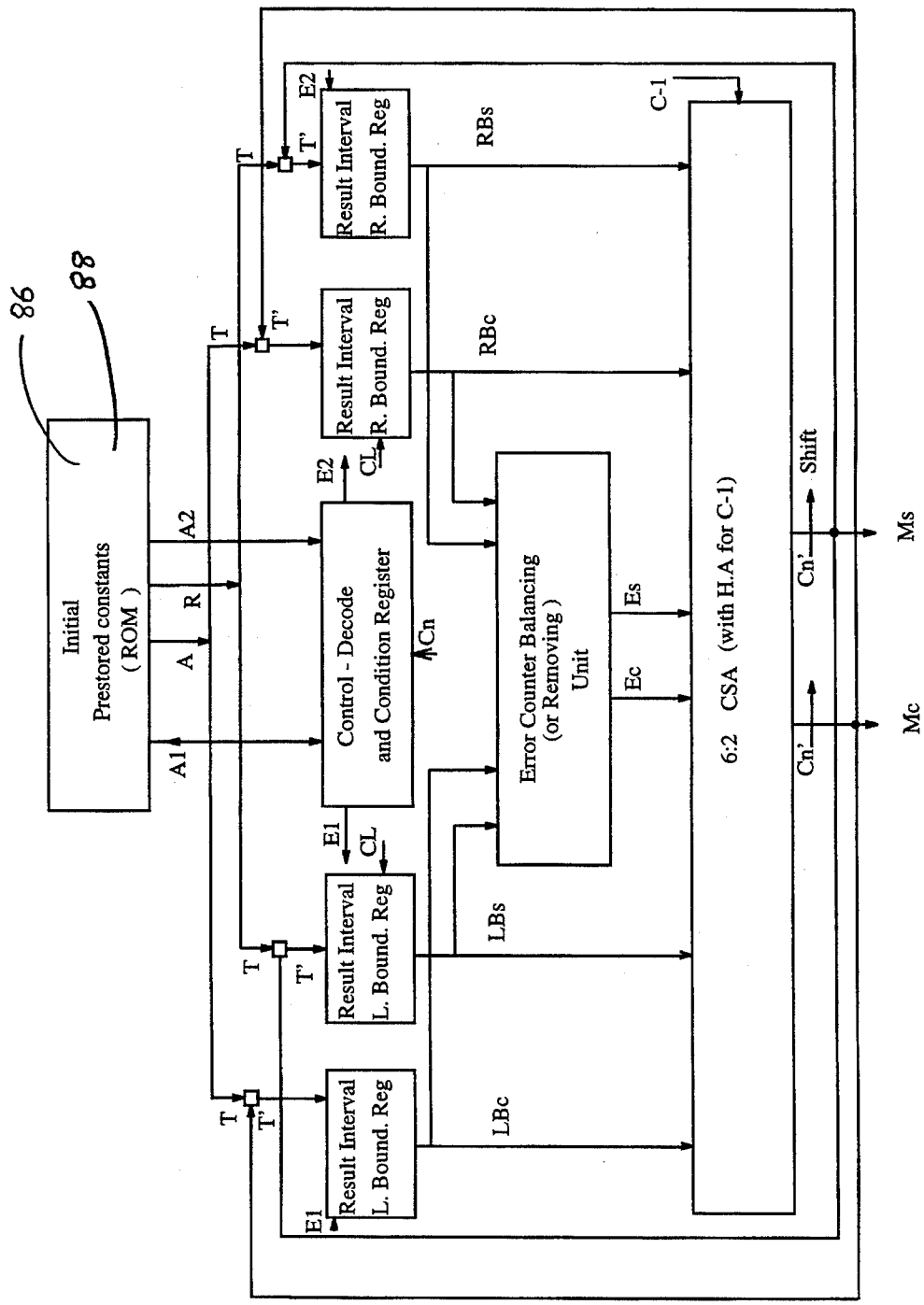
FIG. 8 is the device of FIG. 6 in which a ROM storage unit has been added.

FIG. 8 shows another preferred embodiment of the device 10 which includes storage capacity for the precalculated, error adjusted result values for the operand or argument of ROM error adjusted functions. In this preferred embodiment, two ROMs 86,88 are included. The ROMs are designated the Inverse Function ROM 86 and the Direct Function ROM 88.

Figure 9:
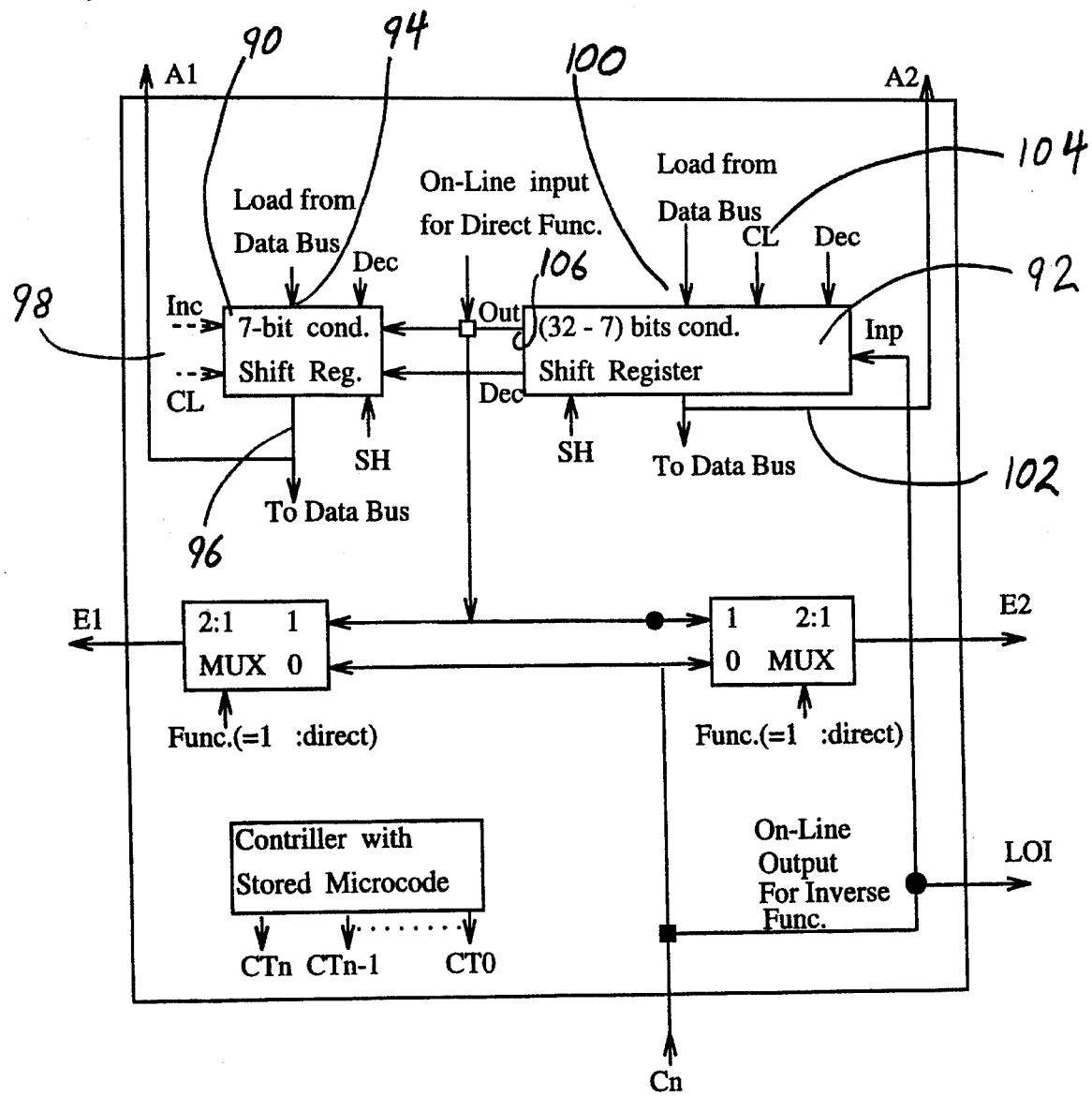
FIG. 9 is a diagram of the modified shift register of FIG. 8.

As shown in FIG. 9, Also in this embodiment, the 32-bit shift register 22 is replaced with two smaller bit capacity shift registers 90,92. The first shift register 90 is a 7-bit shift register; the second shift register 92 is a 25-bit shift register. The seven most significant bits of the argument or operand are stored in the first shift register 90; the twenty-five least significant bits of the argument or operand are stored in the second shift register 92. The first shift register 90 has a parallel data input port 94, a parallel data output port 96 and an enable control input 98. The second shift register 92 has a parallel data input port 100, a parallel data output port 102, and an enable control input 104. In addition, the second shift register 92 has a single bit shifted output port 106.

Figure 10:
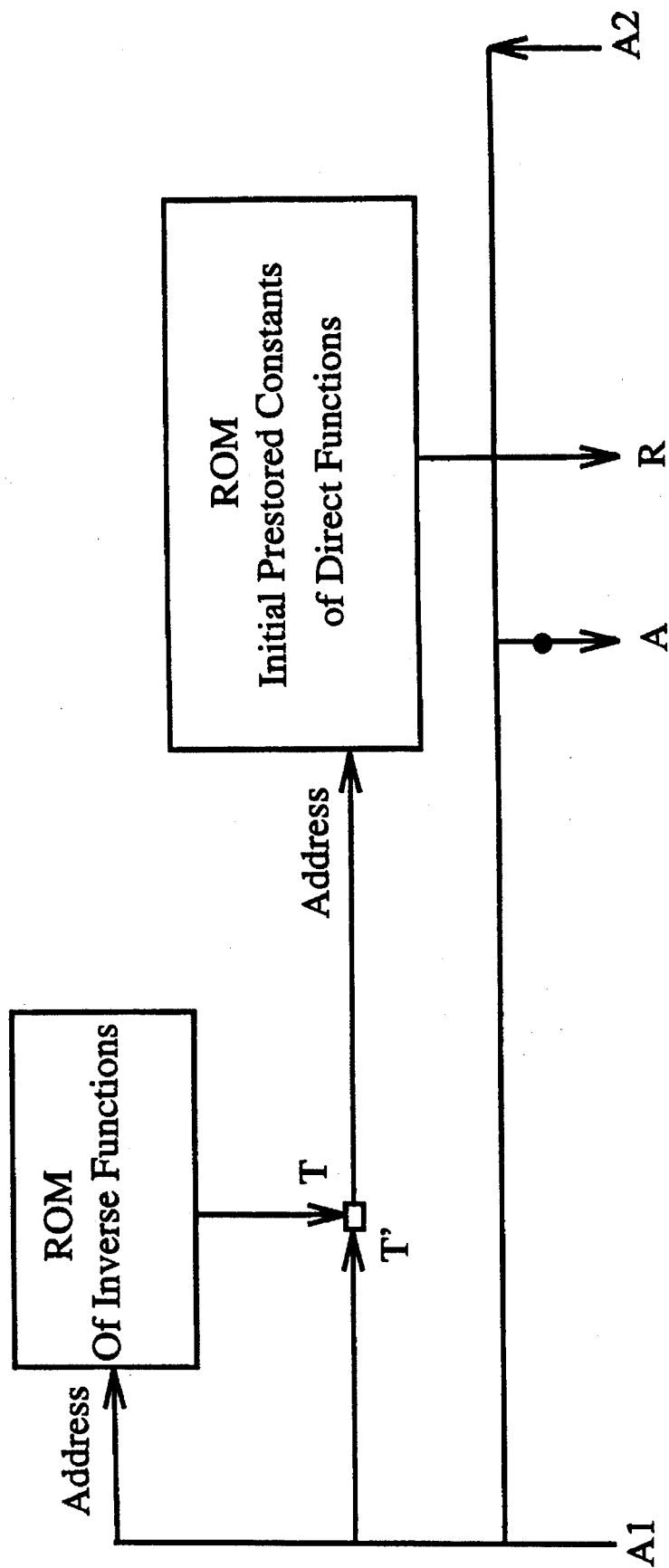
FIG. 10 is a diagram of a preferred ROM addressing scheme.

Although any wellknown addressing scheme which will allow the result values to be retrieved and loaded during initialization of the device is sufficient to practice the invention, this embodiment utilizes the 7 most significant bits of the argument or operator stored in the first shift register 90 to address one of the two ROMs 86,88. This addressing scheme is shown in FIG. 10.

As shown in FIG. 9, the 7 most significant bits of the argument or operand are output from the parallel output of the first shift register to the address bus of the Inverse Function ROM and the Direct Function ROM. The output port of the Inverse Function ROM and the output of the first shift register are connected at a node via complimentarily enabled tri-state buffers. When the signal to the tri-state buffers is low the address seen on the address bus of the Direct Function ROM is the 7 most significant bits of the argument or operand output from the parallel output of the first shift register. When the signal to the tri-state buffers is high the address seen on the address bus of the Direct Function ROM is the contents of the memory location of the Inverse Function ROM addressed by the 7 most significant bits of the argument or operand output from the parallel output of the first shift register and one bit from the second register.

The output of the Direct Function ROM is connected to the input ports of the boundary storage registers through the tri-state buffers previously mentioned.

Figure 2:
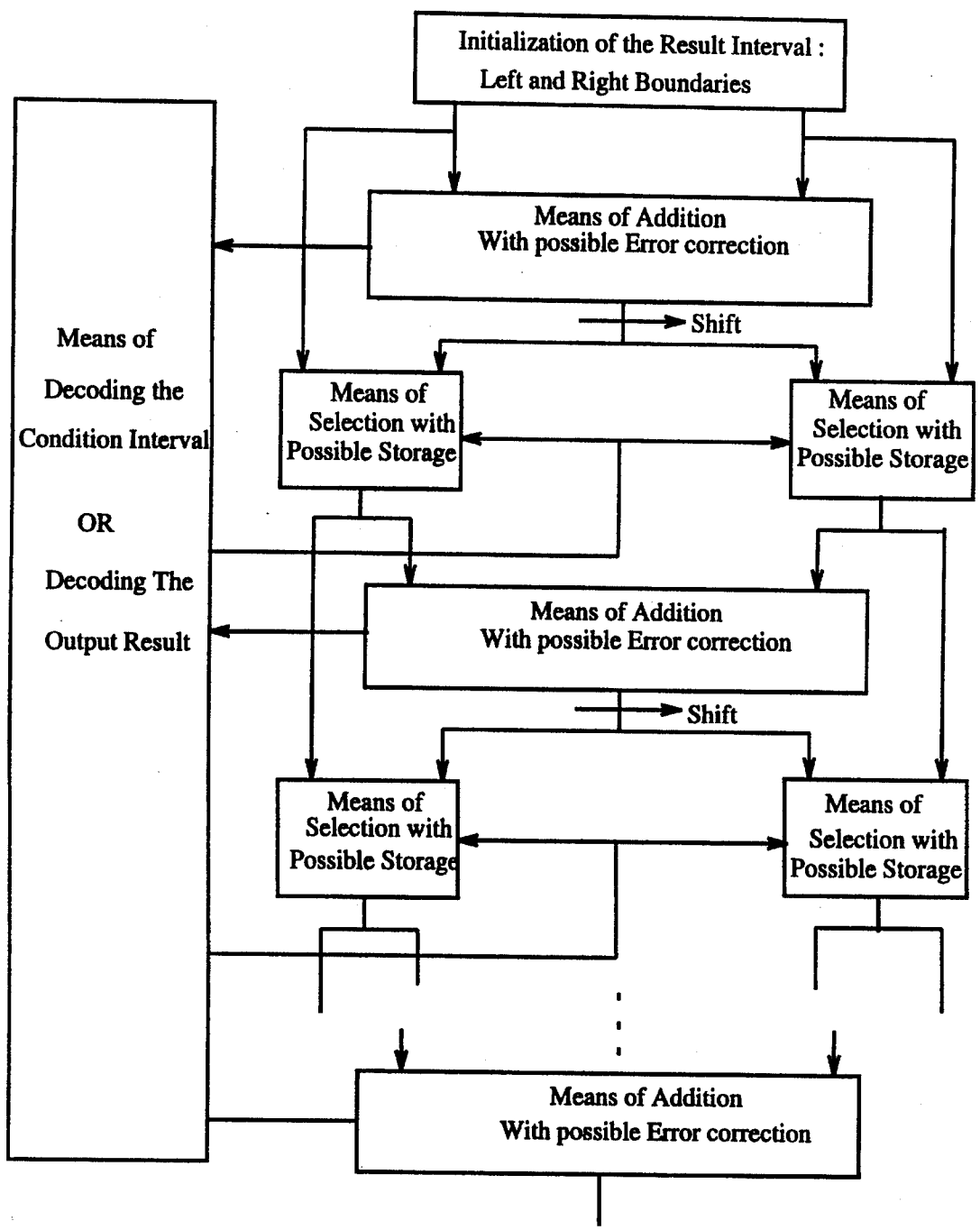
FIG. 2 is an example of parallel implementation of the generalized device.
Figure 11:
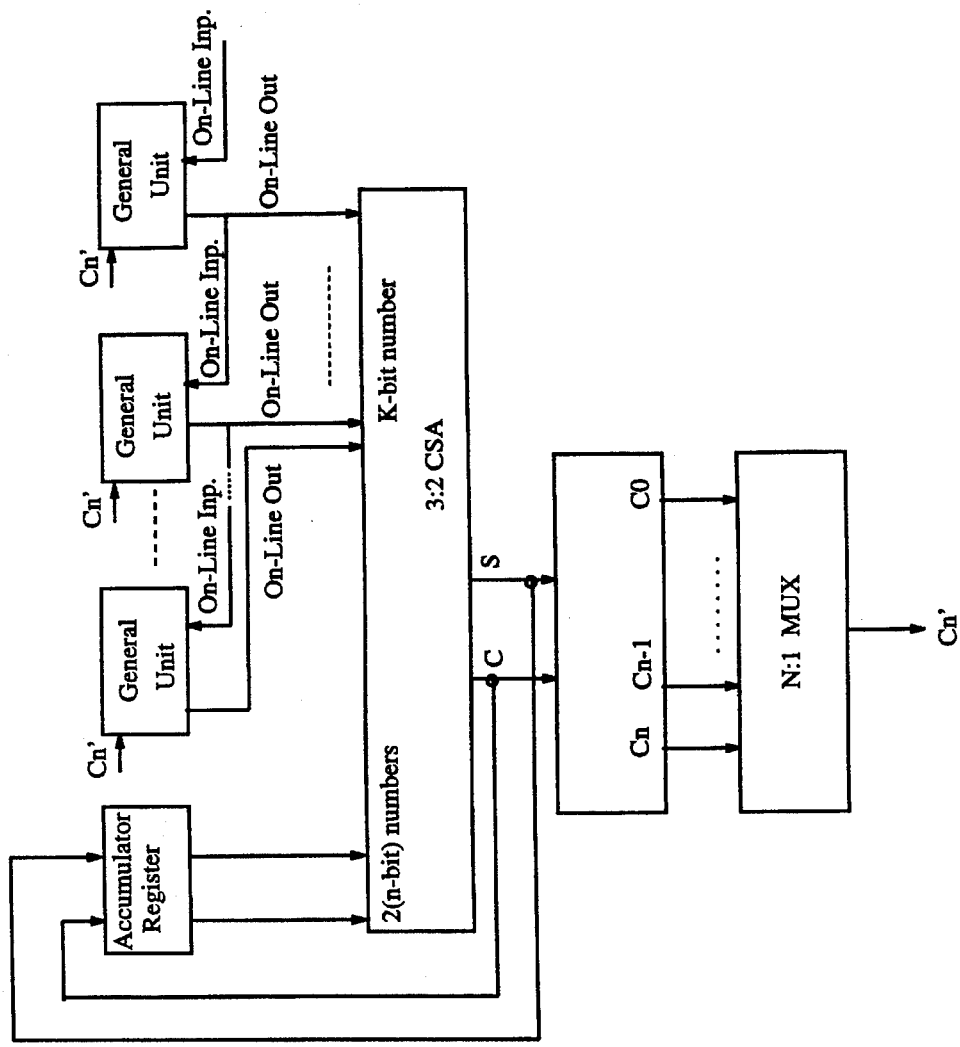
FIG. 11 is a diagram showing an arrangement of general units of the device for evaluation of general inverse functions.

Any of the above described circuits may be implemented in either a component level or on a single chip, in a sequential single unit or in parallel, in an array pattern of duplicate units having registers or latches as storing elements for the intermediate results, or directly connecting the combinational components of the unit by replacing the registers with selecting multiplexers which makes the selection depending on the signal which was called enable in the registers case, as in FIG. 2. FIG. 11 shows an arrangement of the previously described unit where it is possible to calculate the inverse of a general function that consists of sub-functions which are computable by the described unit. This arrangement enables to calculate as a special case the root of general function F(X) in a specified interval. using any well known digital technology.

Figure 12:
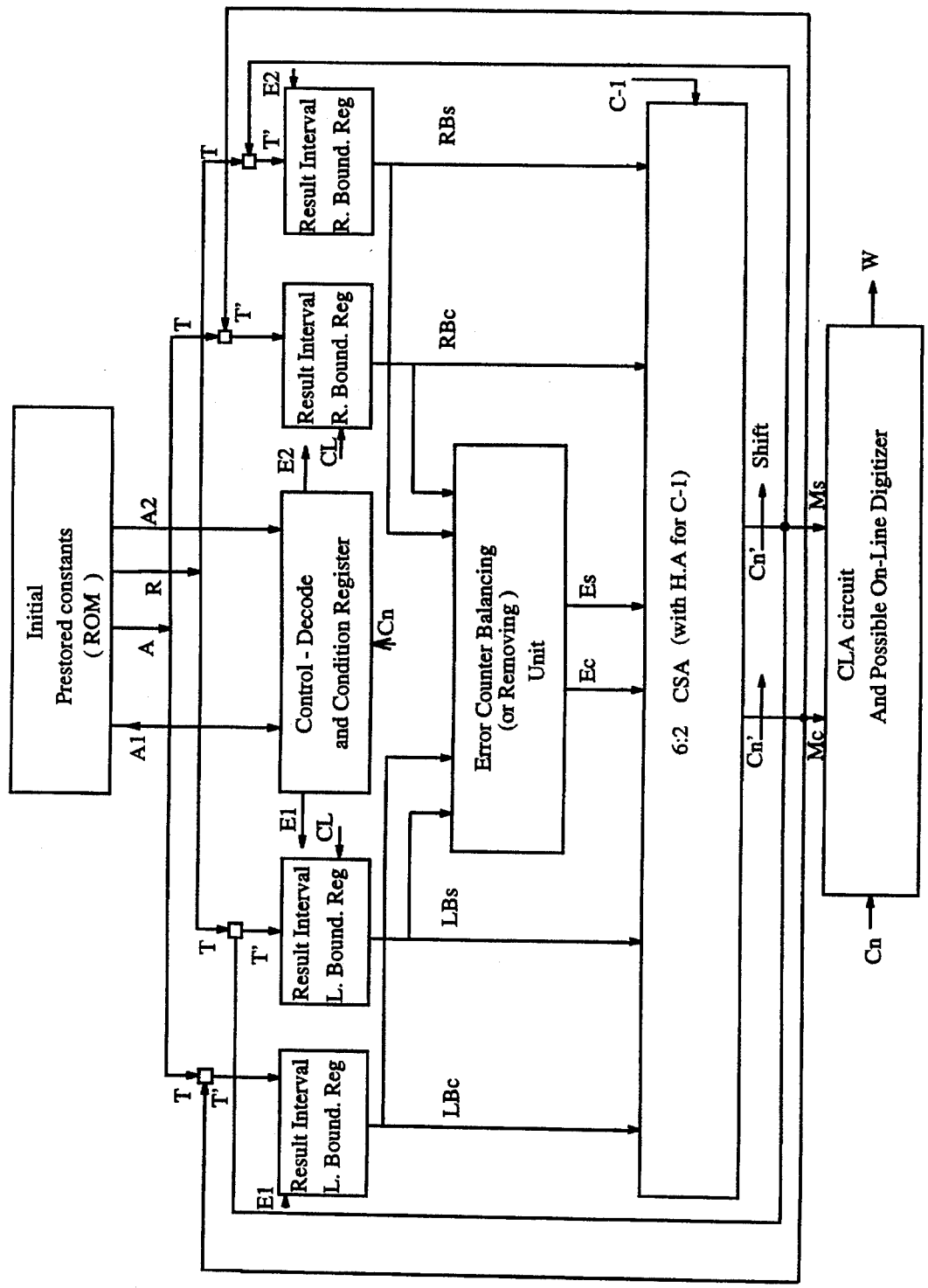
FIG. 12 is the general unit of the invention.
Figure 13:
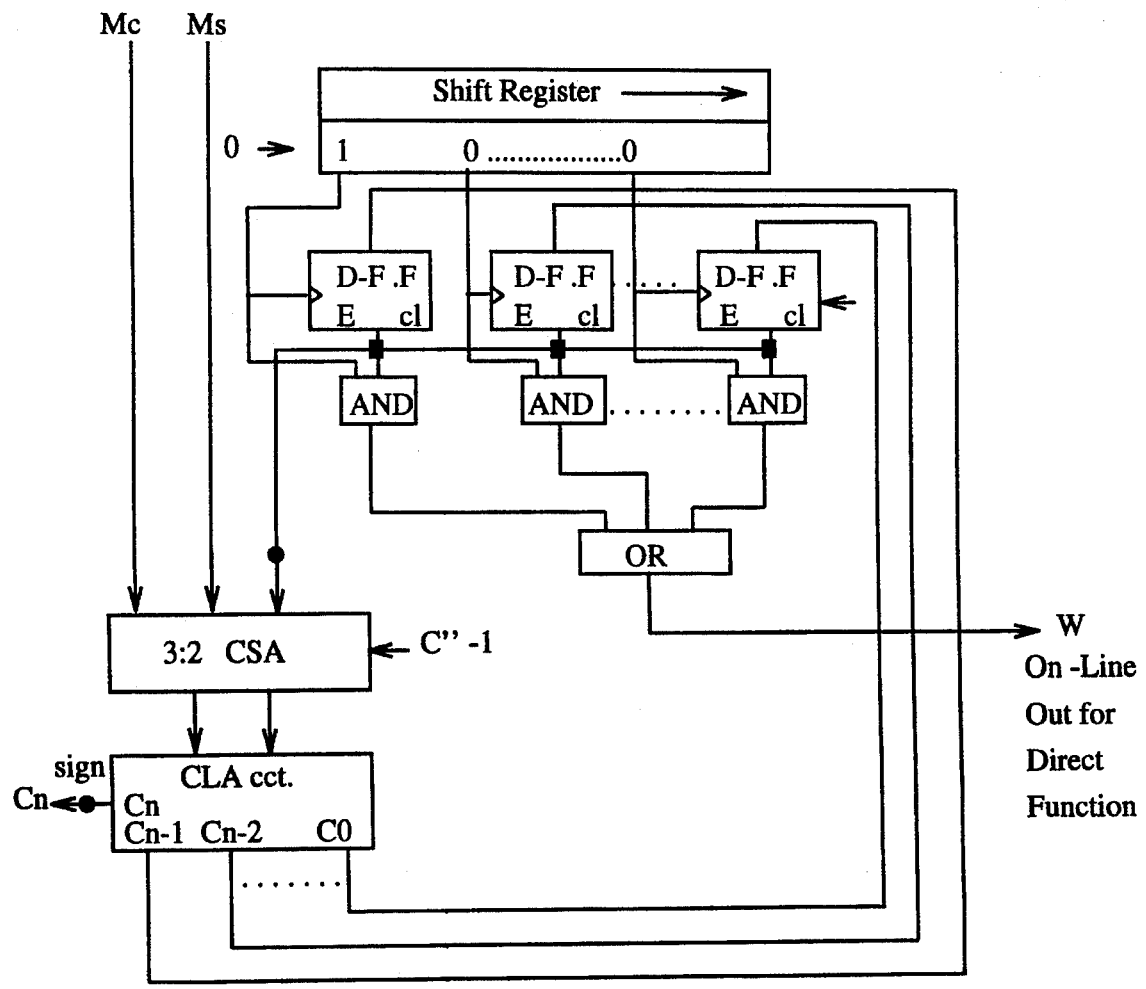
FIG. 13 is diagram of a preferred carry look ahead circuit having an on-line digitizer.
Figure 14:
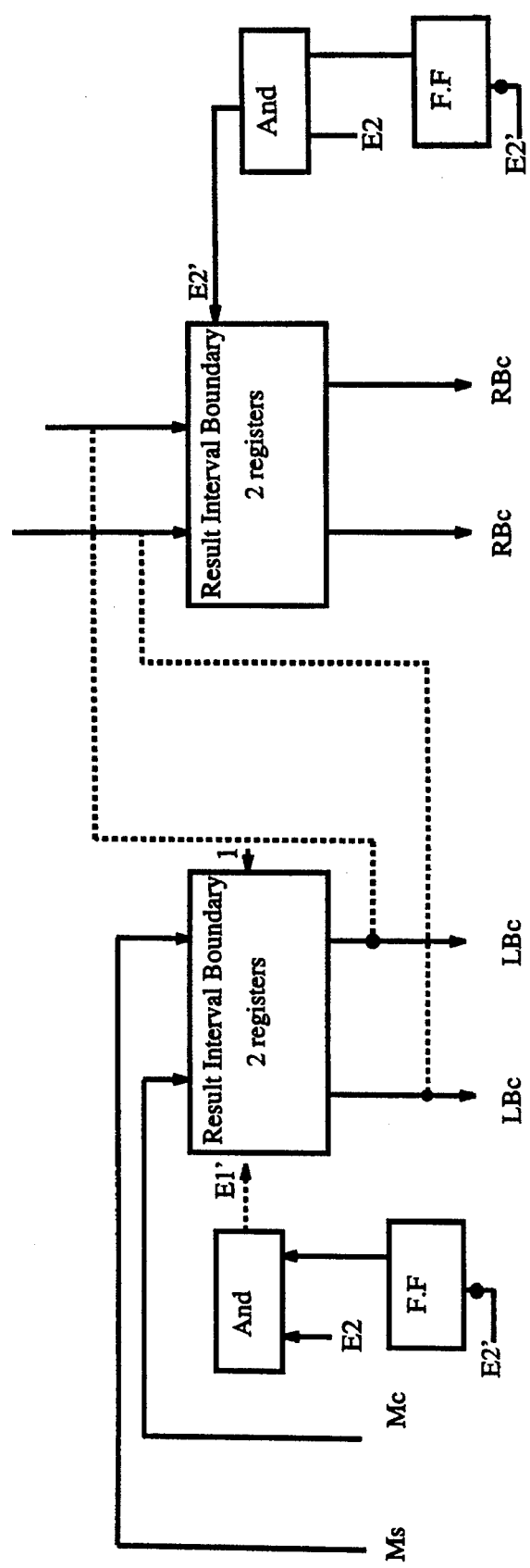
FIG. 14 is another possible arrangement of the result interval.

FIG. 12 shows the device described of FIG. 8 in which the output of the device, Ms and Mc is fed into a carry look ahead circuit and on-line digitizer unit. The carry look ahead circuit and on-line digitizer is shown in FIG. 13.

It is contemplated by the inventor hereof that many circuits comprising the invention herein claimed may be implemented and that many other embodiments of the invention will occur to those skilled in the art. These embodiments are intended to be included within the scope and spirit of the invention which is defined by the following claims.

What is claimed is:

1. A digital circuit for determining the result of mathematical operations when supplied with three binary values having a fixed number of binary bits which correspond to: (i) an initial left boundary limit of a first interval, (ii) an initial right boundary limit of a first interval, and (iii) a given working value, said digital circuit comprising:

a first digital means for selectively storing a value corresponding to a left boundary limit of a first interval in response to a predetermined first enable signal value, said first digital means having a first data input means for receiving data to be stored in said first digital means, a first data output means for outputting the value stored in said first digital means, and a first enable input means for receiving an enable signal, wherein said first digital means stores the data received by said first data input means in response to said first enable input means receiving said predetermined first enable signal value;

a second digital means for selectively storing a value corresponding to a right boundary limit of said first interval in response to a predetermined second enable signal value, said second digital means having a second data input means for receiving data to be stored in said second digital means, a second data output means for outputting the value stored in said second digital means, and a second enable input means for receiving an enable signal, wherein said second digital means stores the data received by said second data input means in response to said second enable input means receiving said predetermined second enable signal value;

a third digital means for selectively storing a value corresponding to a given working value in response to a predetermined third enable signal value, said third digital means having a third data input means for receiving data to be stored in said third digital means, a third enable input means for receiving an enable signal, and a third control output means, in operable connection with said first and second enable input means, for iteratively supplying a derived sequence of enable signals to said first and second enable input means in response to a clock signal, said derived sequence of enable signals being derived from the value stored in said third digital means, said third digital means storing the data received by said third data input means in response to said third enable input means receiving said predetermined third enable signal value;

a fourth digital means for generating a value corresponding to the midpoint of said first interval, said fourth digital means having a fourth data input means, in operable connection with said first and second data output means, for receiving values into said fourth digital means, and a data output means, in operable connection with said first and second data input means, for sending data corresponding to said midpoint value of said first interval generated by said fourth digital means to said first and second data input means; and a controller means for controlling the initialization of said digital circuit.

2. The digital circuit of claim 1 wherein said digital circuit further includes:

a fifth digital means for generating a sequence of error compensating values derived from the initial values of said left and right boundary limits, said fifth digital means having a fifth data input means, in operable connection with said first and second data output means, for receiving data into said fifth digital means; and a fifth data output means, in operable connection with said fourth data input means, for sending said generated error values to said fourth data input means.

3. The digital circuit of claim 2 wherein said third digital means is a shift-left and out register having a data input port, a data output port, an enable input port, a shift-left control input port and a shifted-out output port, said shifted-out output port being in operable connection with said first and second enable input means, said shift left register shifting the value contained therein one bit to the left during each clock cycle.

4. The digital circuit of claim 3 wherein said fourth digital means is a digital adder having a first, a second and a third adder input port and an adder output port, said digital adder adding the values placed on said first, second and third adder input ports and outputting the result from said adder output port, said first and second data input ports being in operable connection with said adder output port in a manner such that the value received by said first and second data input ports is one-half the value output from said adder output port.

5. The digital circuit of claim 4 wherein said digital circuit further includes a first addressable memory circuit having an initial error adjusted result value for the functions: cos(X); cosh(X); sinh(X) for a sufficient number of the most significant bits for binary values of X lying within a chosen normalized range.

6. The digital circuit of claim 5 wherein said digital circuit further includes a second addressable memory circuit having an initial error adjusted result value for the functions:

$\cos^{-1}(X)$; $Ln(X)$; $\cosh^{-1}(X)$; and, $\sinh^{-1}(X)$ for a sufficient number of the most significant bits for binary values of X lying within a chosen normalized range.

7. A digital circuit for determining the result of mathematical operations when supplied with three binary values having a fixed number of binary bits which correspond to: (i) an initial left boundary limit of a first interval, (ii) an initial right boundary limit of a first interval, and (iii) a given working value, said digital circuit comprising:

a first register having a plurality of bit storage locations and a corresponding number of data input and output lines, said data input lines being controlled by a control signal;

a second register having a plurality of bit storage locations and a corresponding number of data input and output lines, said data input lines being controlled by a control signal;

a third register having a plurality of memory locations and a corresponding number of data input and output lines, said data input lines being controlled by a control signal;

a fourth register having a plurality of memory locations and a corresponding number of data input and output lines, said data input lines being controlled by a control signal;

a shift left register having a plurality of memory locations, an input, a shift-output port operably connected to said data input lines of said first, second, third, and fourth registers, and a shift input, wherein the value stored in said shift register is shifted to the left and the most significant bit is shifted out the shift-output port each time said shift input is activated;

a 4:2 carry save adder wherein said outputs from said first, second, third and fourth registers are connected to the four inputs of said 4:2 carry save adder, the carry output of said 4:2 carry save adder is connected to said data input lines of said first and third registers, and the sum output of said 4:2 carry save adder is connected to said data input lines of said second and fourth registers, said carry output and said sum output being further operably connected to said input and said shift input of said shift register; and means for controlling the initialization of said shift register and said first, second, third and fourth registers in a manner such that said first and third registers are set to zero, said second register is loaded with the initial left boundary limit, said fourth register is loaded with the initial right boundary limit, and said shift register is loaded with the given working value.

8. The digital circuit of claim 7 wherein said digital circuit further includes:

an error counter balancing unit comprising:
   a left boundary error storage means, in operational connection with said output lines of said first and second registers, having first and second error registers, each of said first and second error registers having a plurality of bit storage locations and input and output ports;
   a right boundary error storage means, in operational connection with said output lines of said third and fourth registers, having third and fourth error registers, each of said third and fourth error registers including a plurality of bit storage locations and input and output ports;
   a carry sum adder having four inputs operably connected to said first and second registers via said left boundary error storage means and to said third and fourth registers via said right boundary error storage means and two outputs operably connected to said first, second, third, and fourth register input ports;
   a first 2:1 multiplexer operably connected to said right and left boundary error storage means;
   a second 2:1 multiplexer operably connected to said right and left boundary error storage means;
   a first array of Exclusive-Or gates, operably connected to said first 2:1 multiplexer, containing a plurality of said gates equal to the number of storage bits of said left boundary error storage means;
   a second array of Exclusive-Or gates, operably connected to said second 2:1 multiplexer, containing a plurality of said gates equal to the number of storage bits of said left boundary error storage means.

* * * * *